(12) United States Patent
Saila

(10) Patent No.: US 8,248,372 B2
(45) Date of Patent: Aug. 21, 2012

(54) METHOD AND APPARATUS FOR ACTIVATING ONE OR MORE REMOTE FEATURES

(75) Inventor: Sami Ilmari Saila, Halikko (FI)

(73) Assignee: Nokia Corporation, Espoo (FI)

( * ) Notice: Subject to any disclaimer, the term of this patent is extended or adjusted under 35 U.S.C. 154(b) by 502 days.

(21) Appl. No.: 12/492,519

(22) Filed: Jun. 26, 2009

(65) Prior Publication Data

US 2010/0330912 A1 Dec. 30, 2010

(51) Int. Cl.
*G09G 5/00* (2006.01)
(52) U.S. Cl. ........................................ 345/169; 345/156
(58) Field of Classification Search ........... 345/156–173
See application file for complete search history.

(56) References Cited

U.S. PATENT DOCUMENTS

| | | | | |
|---|---|---|---|---|
| 6,750,848 B1* | 6/2004 | Pryor | | 345/168 |
| 8,049,721 B2* | 11/2011 | Tagawa | | 345/158 |
| 2003/0030622 A1* | 2/2003 | Vaarala | | 345/158 |
| 2007/0003169 A1* | 1/2007 | Wang et al. | | 382/314 |
| 2008/0170033 A1* | 7/2008 | Schultz | | 345/157 |
| 2008/0174551 A1* | 7/2008 | Ishibashi | | 345/158 |
| 2008/0249777 A1* | 10/2008 | Thelen et al. | | 704/270 |
| 2009/0051647 A1* | 2/2009 | Su et al. | | 345/156 |
| 2009/0115725 A1* | 5/2009 | Shemesh et al. | | 345/158 |
| 2010/0277415 A1* | 11/2010 | Shanmugam et al. | | 345/169 |
| 2011/0109549 A1* | 5/2011 | Robbins et al. | | 345/161 |

\* cited by examiner

*Primary Examiner* — Nitin Patel
(74) *Attorney, Agent, or Firm* — Harrington & Smith

(57) ABSTRACT

In accordance with an example embodiment of the present invention, an apparatus comprises a pointing module configured to determine a location. Further, the apparatus comprise a camera module configured to track movement of the pointing module. The apparatus also comprises a communicator module configured to activate a feature based at least in part on the tracked movement.

22 Claims, 6 Drawing Sheets

METHOD AND APPARATUS FOR ACTIVATING ONE OR MORE REMOTE FEATURES

TECHNICAL FIELD

The present application relates generally to activating remote features.

BACKGROUND

Today devices, such as a computer, are widely used for using application features. Users can use the device to activate such application features. In this way, a user use devices.

SUMMARY

Various aspects of examples of the invention are set out in the claims.

According to a first aspect of the present invention, an apparatus comprises a pointing module configured to determine a location. Further, the apparatus comprise a camera module configured to track movement of the pointing module. The apparatus also comprises a communicator module configured to activate a feature based at least in part on the tracked movement.

According to a second aspect of the present invention, a method comprises determining a location using a pointing module; tracking movement of the pointing module using a camera module; and activating a feature based at least in part on the tracked movement using a communicator module.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1A through 6 of the drawings.

Figure 1A:
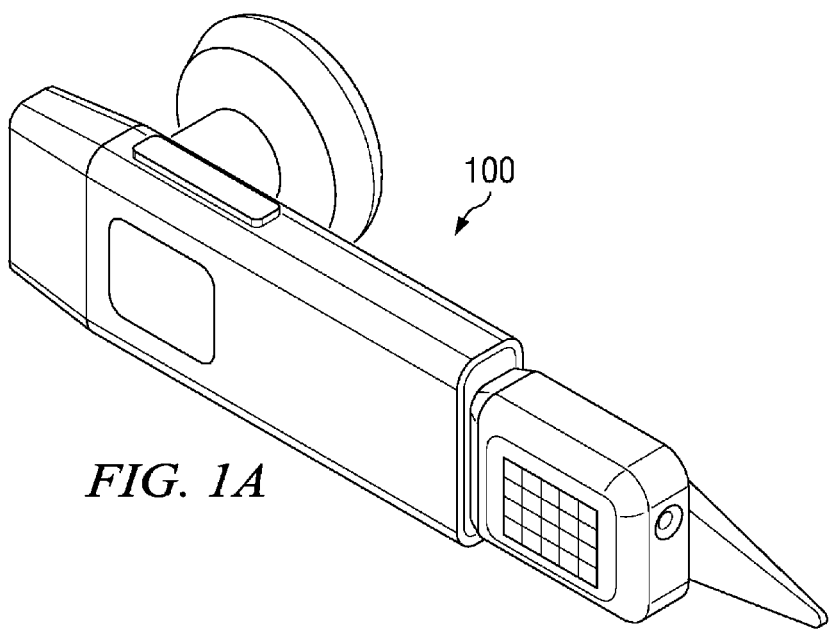
FIG. 1A is a block diagram depicting an electronic device operating in accordance with an example embodiment of the invention.

FIG. 1A is a block diagram depicting an electronic device 100 operating in accordance with an example embodiment of the invention. In an example embodiment, the electronic device 100 comprises a pointing module, a camera module, a communicator module, a universal serial bus module, and optionally a speaker, a microphone, and a feature activation module. An electronic device 100 is at least one of a headset, mobile communications device, personal digital assistant (PDA), cell phone, pager, laptop computer, palmtop computer, and/or the like. In an embodiment, the electronic device 100 is in communication with a second electronic device.

Figure 1B:
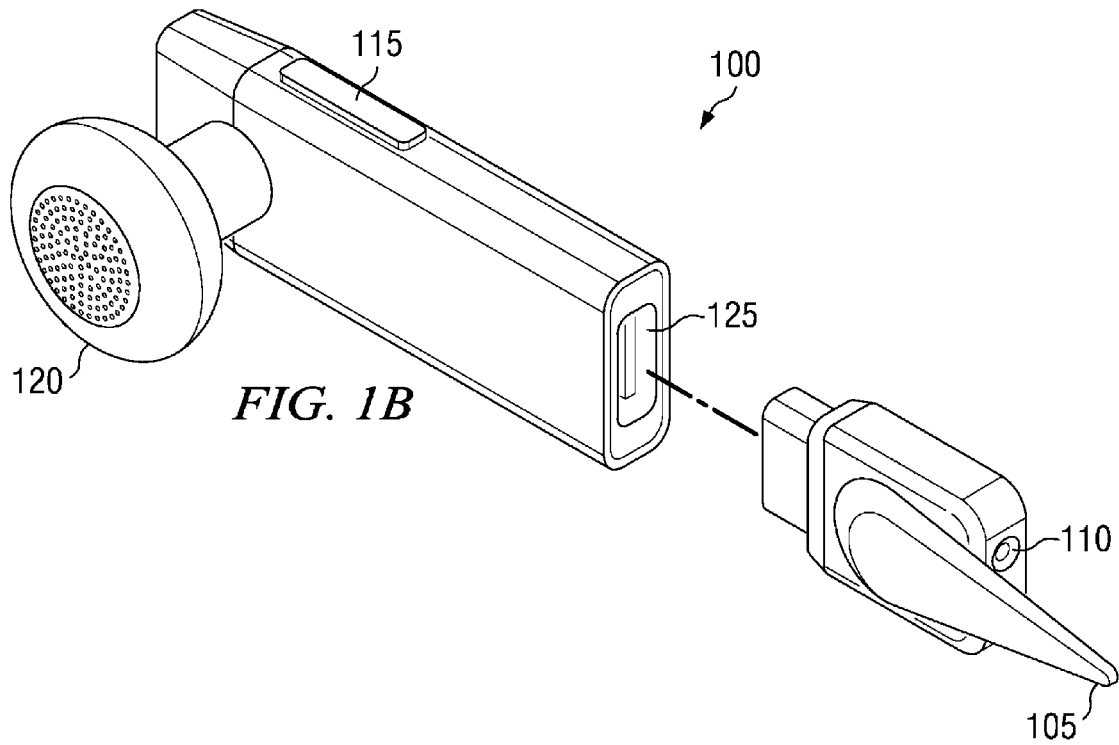
FIG. 1B is a block diagram depicting an exploded view of an electronic device operating in accordance with an example embodiment of the invention.

FIG. 1B is a block diagram depicting an exploded view of an electronic device 100 operating in accordance with an example embodiment of the invention. In an example embodiment, the electronic device 100 comprises a pointing module 105, a camera module 110, a communicator module 115, and optionally a speaker 120, a universal serial bus module 125, a microphone, and a feature activation module.

In an example embodiment, the pointing module 105 is configured to determine a location. For example, the pointing module 105 determines a location of the module on, for example, a second electronic device display. In an embodiment, the pointing module 105 determines location from at least one of: a mouse movement, a flick, panning, rotating, zooming, or a combination thereof. In an embodiment, the flick, panning, rotating, zooming, or a combination thereof indicates activation of the feature. For example, by flicking the pointing module 105 a user selects a feature on the second electronic device.

In an embodiment, the pointing module 105 is configured to scan at the location. For example, the pointing module 105 scans a phone number on a television screen, e.g., a second electronic device. By employing example embodiments, a user may initiate a call based at least in part from the scanned phone number. In an embodiment, the pointing module 105 is configured use the scan to perform a facial recognition, building recognition, object recognition, personal recognition, and/or the like. For example, the pointing module 105 identifies a person by scanning on the second electronic device. In such a case, a user may contact the person and/or object by email, messages, enter a website, and/or the like. In an example embodiment, the electronic device is configured to be used as a remote control associated with the second electronic device.

In an example embodiment, the electronic device 100 is configured to interact as 3 dimensional navigators. For example, the electronic device 100 allows user interaction between open documents, applications, history, and/or the like. In an embodiment, the camera module 110 is configured to determine at least one of distance, direction, speed, and/or the like of objects on the second electronic device. For example, the camera module 110 may be use sensors as known in the art to allow interaction with varying distances, directions, speeds, and/or the like displayed on the second electronic device. In an example embodiment, the electronic device 100 is adapted to be an earpiece. In such a case, the electronic device 100 is configured to track user movements and/or movements and/or distances of the second electronic device or surrounding to augmented reality. For example, the electronic device 100 allows a user to use an earpiece as a remote control based at least in parts on user movements and/or movements and/or distances of the second electronic device or surrounding. In an example embodiment, the electronic device 100 or the second electronic device displays a moving background. In such a case, the electronic device 100 allows interaction of the moving backgrounds by employing example embodiments and/or sensors.

In an alternative embodiment, the pointing module 105 is configured to operate as a writing implement. For example, the pointing module 105 allows a user to write on a display. In an embodiment, the pointing module 105 performs like a stylus from a distance. Restated, the pointing module 105 does not touch the display of a second electronic device. In an alternative embodiment, the pointing module 105 may touch the display of a second electronic device.

In an example embodiment, the camera module 110 is configured to track movement of the pointing module. In an embodiment, the camera module 110 is further configured to track movement on at least one of a touchscreen, a television, a projector, a table surface, a video game display, a car navigator, a computer, or a combination thereof. For example, the camera module 100 tracks movement on a display related to the pointing module 105. In an embodiment, the camera module 110 is configured to detect a distance related to the location. For example, the camera module 110 detects the distance of the pointing module 105 from a second electronic device and/or surface.

In an example embodiment, the communicator module 115 is configured to activate a feature based at least in part on the tracked movement. For example, the communicator module 115 transmits to the second electronic device an instruction, such as a click or mouse movement based on the tracked movement.

In an example embodiment, the communicator module 115 uses BlueTooth or other suitable wireless technology. By using BlueTooth technology it is possible to turn the BlueTooth enable electronic device 100 into 3D optical mouse & navigator. When putting USB connector to BT-headset for charging, it can also be used as interface for the 3D optical mouse & navigator module.

In an embodiment, the universal serial bus (USB) module 125 configured to charge the electronic device 100. For example, the USB module 125 uses technology as known in the art to charge the electronic device 100 by way of connection. In an embodiment, the USB module 125 is configured to allow the communicator module to communicate. For example, the USB module 125 is used to communicate using USB technology.

Some possible technical effects of using the electronic device 100 are using an ordinary device as touch screen, using the electronic device 100 as a pen and/or stylus, using the electronic device 100 as a navigator when for example, pressing or otherwise selecting the feature activation module, using the electronic device 100 as a 3 dimensional navigator between open documents and applications or history, using the electronic device 100 for zooming to view content, using the electronic device 100 as a mouse, using the electronic device 100 to use a display and/or data projector as your canvas for displaying, using the electronic device 100 to scan phone numbers from text and make the call by pressing or otherwise selecting the feature activation module, using the electronic device 100 in a vehicle to zoom and/or pan a map on a global positioning system (GPS) device, using the electronic device 100 as a remote control for a video game console, and/or the like.

Figure 1C:
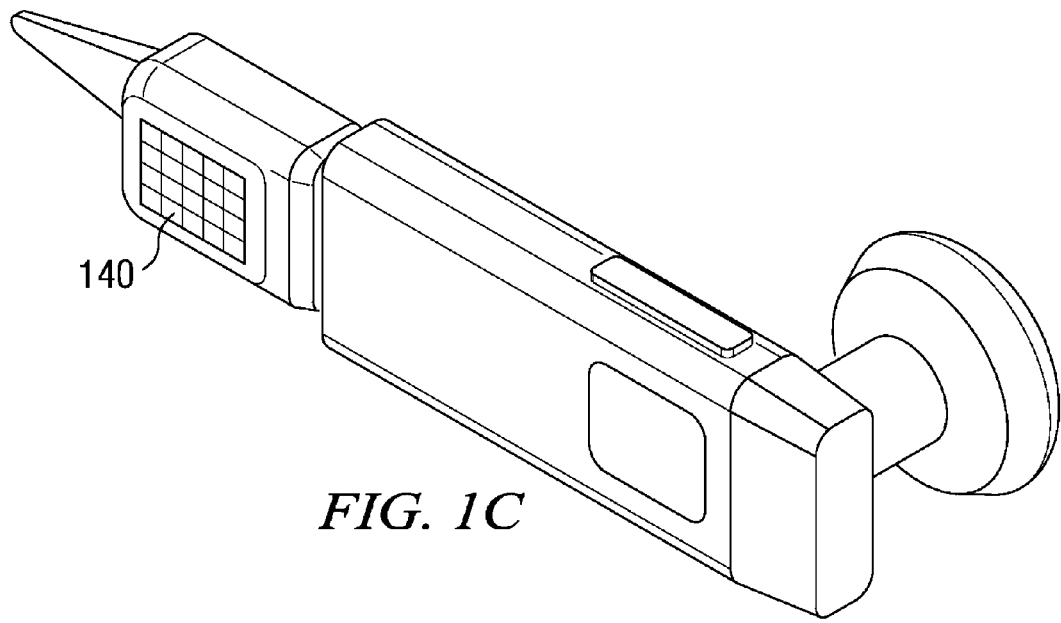
FIG. 1C is a block diagram depicting another electronic device view operating in accordance with an example embodiment of the invention.

FIG. 1C is a block diagram depicting another electronic device view operating in accordance with an example embodiment of the invention. In an example embodiment, the electronic device 100 comprises a pointing module, a camera module, a communicator module, and optionally a speaker, a microphone, and a feature activation module 140.

In an example embodiment, the feature activation module 140 is configured to activate a feature by pressing a button or otherwise indicating selection. For example, the feature activation module 140 may be a button a user may press. In such a case, the user press of the feature activation module 140 may activate a feature on a second electronic and/or surface. For example, a pointing module, such as pointing module 105 of FIG. 1B, is pointing at a screen option on a second electronic device, which may be selected by pressing the button. Other feature activations, such as selection, movement, zooming, panning, and/or the like are also possible. It should be understood that the feature activations listed above are merely examples and not intended to be an exhaustive list of features.

Figure 2:
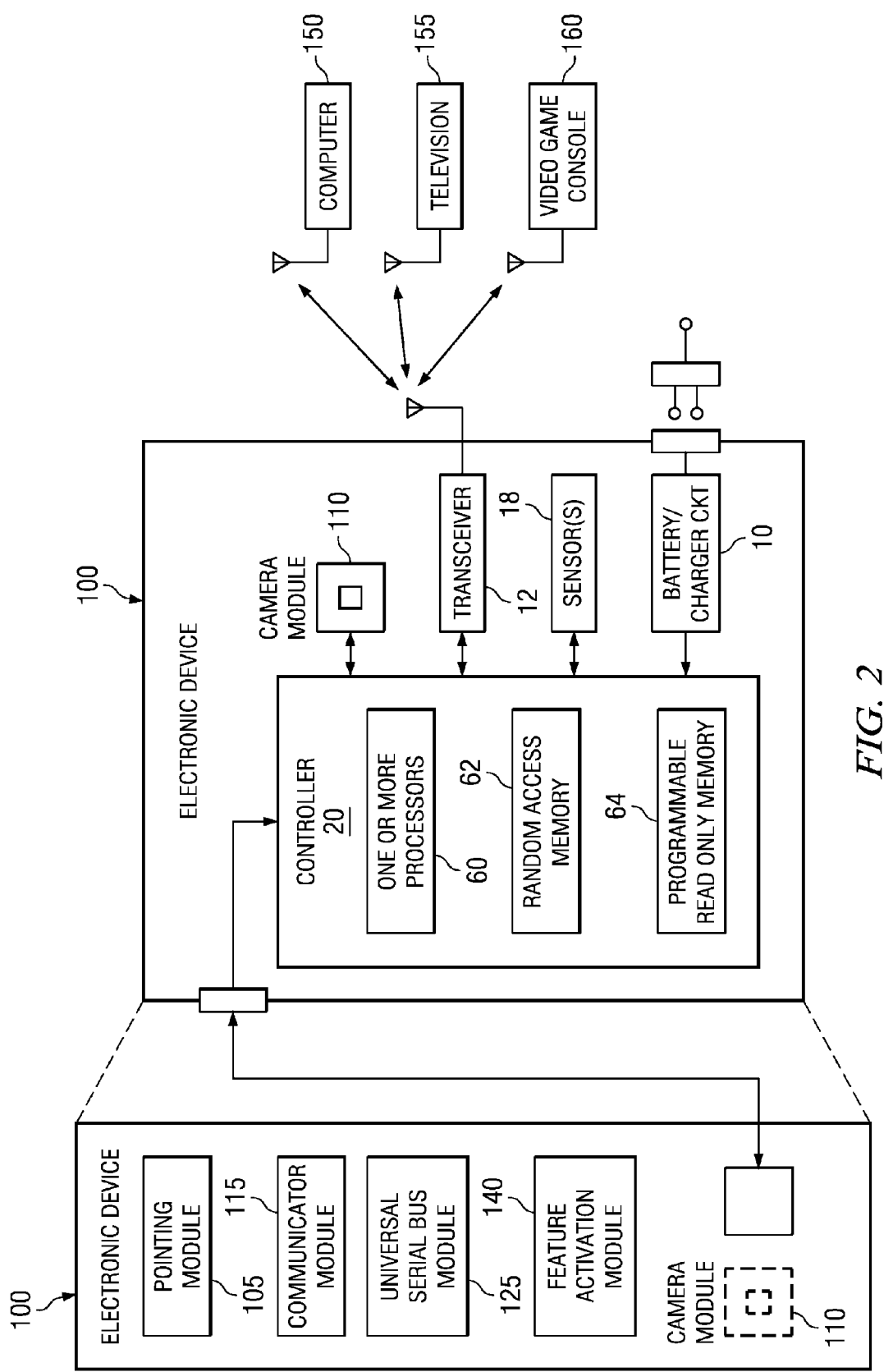
FIG. 2 is a block diagram depicting of another view of the electronic device of FIGS. 1A-1C.

FIG. 2 is a block diagram of another view of the electronic device 100 of FIGS. 1A-1C operating in accordance with an example embodiment of the invention. In an example embodiment, the electronic device 100 comprises a pointing module 105, a camera module 110, a communicator module 115, and a universal serial bus module 125. In an embodiment, the electronic device 100 may optionally include a microphone, speakers, ear pieces, and/or the like.

In an example embodiment, the electronic device 100 comprises a controller module 20, which comprises one or more processors 60, a random access memory (RAM) 62, a read only memory (ROM) and/or programmable read only memory (PROM) 64. Further, the electronic device 100 comprises at least one of: a transceiver 12, sensor 18, and/or a battery charger circuit 10.

In an example embodiment, the one or more processors 60 may recognize the presence of a known device, such as the second electronic device described above. The processor 60, for example, may recognize a device, such a navigation device, video game console, television, computer, and/or the like based at least in part from a Bluetooth or other wireless signal. The transceiver 12 communicates, using a Bluetooth device address, for example, with the second electronic device and the processor 60. It should be understood that the example embodiments of the invention may communicate with any number of different devices and is not limited to Bluetooth devices.

Other components that may be included in the electronic device 100 include sensors 18, which may detect changes in the inertial frame of reference of the electronic device 100, to enable determination of location and/or the like.

In an example embodiment, the electronic device 100 comprises the camera module 105, which may comprise a lens, an electric shutter, a CMOS sensor, and/or an analog to digital converter. The lens converge incident light on the CMOS sensor. The electric shutter may be an electromechanical or electro-optical shutter that is opaque to the incident light until actuated by the shutter button. The CMOS sensor may be an RGB color filter that converts incident light into electric signals representing red, green, and blue light components. Objects or images are recorded by directing a pointing module, such as pointing module 105 of FIG. 1B, at a second electronic device and/or surface. Electric signals representing red, green, and blue light output by the CMOS sensor are converted to digital image or object signals by the analog to digital converter and output to the controller 20. The image sensor may comprise a different type of sensor, such as a Charge Coupled Device (CCD). The camera module 105 may be mounted anywhere on the electronic device 100, for example, on the pointing module portion, the front side of the electronic device 100, or connected to the electronic device 100 via a cable, Bluetooth, or other Wireless Personal Area Network (WPAN) link.

In an example embodiment, the electronic device 100 communicates with one or more electronic devices or surfaces, such as a computer 150, a television 155, a video game console 160, and/or the like. Further, the electronic device 100 communicates in a wireless network that may be a wireless personal area network (WPAN) operating, for example, under the Bluetooth or IEEE 802.15 network protocol. For example, the wireless network may be a wireless local area network (WLAN) operating, for example under the IEEE 802.11, Hiperlan, WiMedia Ultra Wide Band (UWB), WiMax, WiFi, Digital Enhanced Cordless Telecommunications (DECT) network protocol, and/or the like. Or, the wireless network may be a wireless wide area network (WWAN) operating, for example, under a cellular telephone network protocol, for example Global System for Mobile (GSM), General Packet Radio Service (GPRS), Enhanced Data rates for GSM Evolution (EDGE), Code Division Multiple Access (CDMA), Universal Mobile Telecommunications System (UMTS) CDMA2000, and/or the like, The respective wireless network protocols include provision for communication by the electronic device 100 in the network with the electronic devices. These examples of wireless network protocols for the electronic device 100 are not meant to be limiting, since it is common for wireless communications protocols to provide for communication between electronic devices and a wired network infrastructure.

In an embodiment, the communications protocol may define levels of networking functions and the services performed at each level for the location source and the electronic device 100 operating using the protocol.

Figure 3:
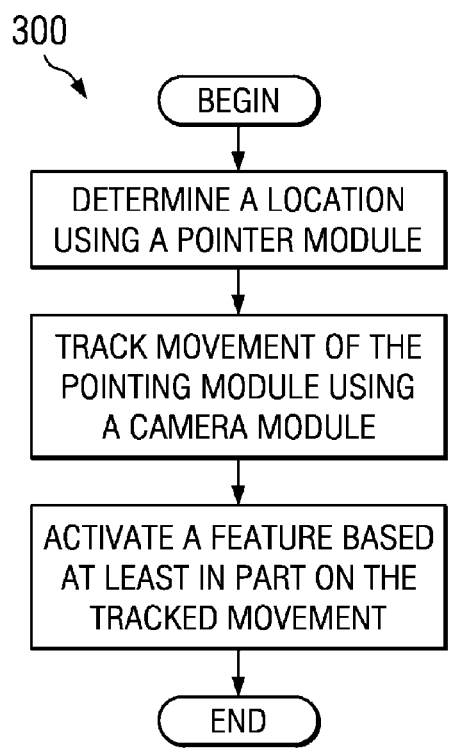
FIG. 3 is a flow diagram illustrating an example method for operating an electronic device in accordance with an example embodiment of the invention.

FIG. 3 is a flow diagram illustrating an example method 300 for operating an electronic device in accordance with an example embodiment of the invention. Example method 300 may be performed by an electronic device, such as electronic device 100 of FIGS. 1A-2.

At 305, a location is determined using a pointing module. In an example embodiment, a pointing module, such as pointing module 105 of FIG. 1B, is configured to determine a location. For example, the pointing module 105 determines a location of the module on, for example, a second electronic device display.

At 310, movement of the pointing nodule is tracked using a camera module. In an example embodiment, a camera module, such as camera module 110 of FIG. 1B, is configured to track movement of the pointing module. In an embodiment, the camera module is further configured to track movement on at least one of a touchscreen, a television, a projector, a table surface, a video game display, a car navigator, a computer, or a combination thereof. For example, the camera module 100 tracks movement on a display related to the pointing module.

At 315, a feature is activated based at least in part on the tracked movement using a communicator module. In an example embodiment, a communicator module, such as communicator module 115 of FIG. 1b, is configured to activate a feature based at least in part on the tracked movement. For example, the communicator module 115 transmits to the second electronic device an instruction, such as a click or mouse movement based on the tracked movement. In an alternative embodiment, the communicator module is configured to activate a feature based at least in part on a selection from a feature activation module, such as feature activation module 140 of FIG. 1C. The example method 300 ends.

Figure 4:
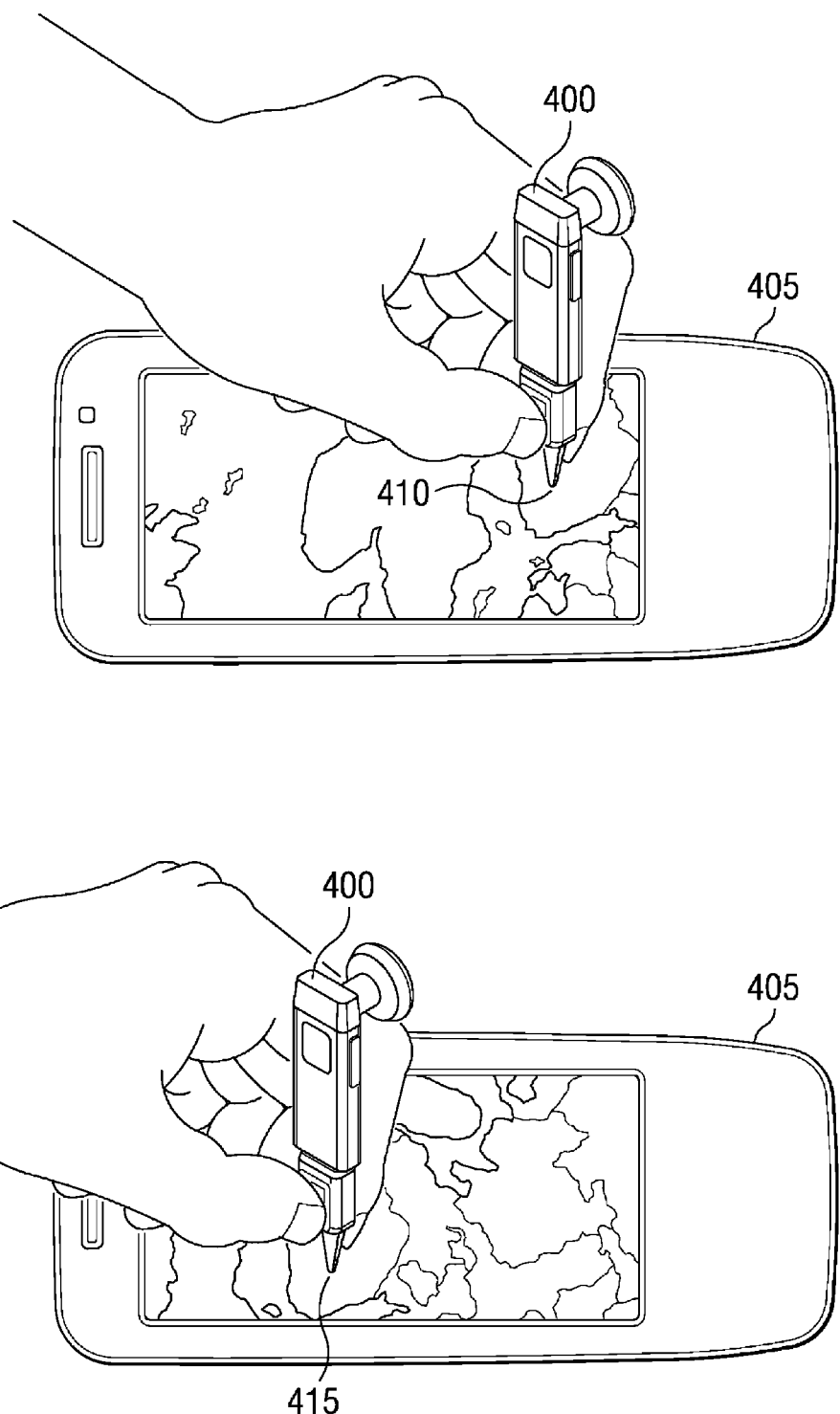
FIG. 4 is a block diagram depicting a panning feature in accordance with an example embodiment of the invention.

FIG. 4 is a block diagram depicting a panning feature in accordance with an example embodiment of the invention. In an example embodiment, electronic device 400 is similar to electronic device 100 of FIGS. 1A-2. In an alternative embodiment, electronic device 400 is different than electronic device 100 of FIGS. 1A-2.

In an example embodiment, an electronic device 400 interacts with a second electronic device 405. In particular, the electronic device 410 touches 410 or otherwise selects the second electronic device 405. In an alternative embodiment, a user touches 410 or otherwise selects another portion of the second electronic device 405, such as a touch screen, table, center point, and/or the like, with the electronic device 400 instead of the rotation point 405. A feature activation module, such as the feature activation module 140 of FIG. 1C, is pressed or otherwise selected to drag 415 the display on the second electronic device 405. In this way, the electronic device 400 activates a feature, e.g., panning feature, on the second electronic device 405.

Figure 5:
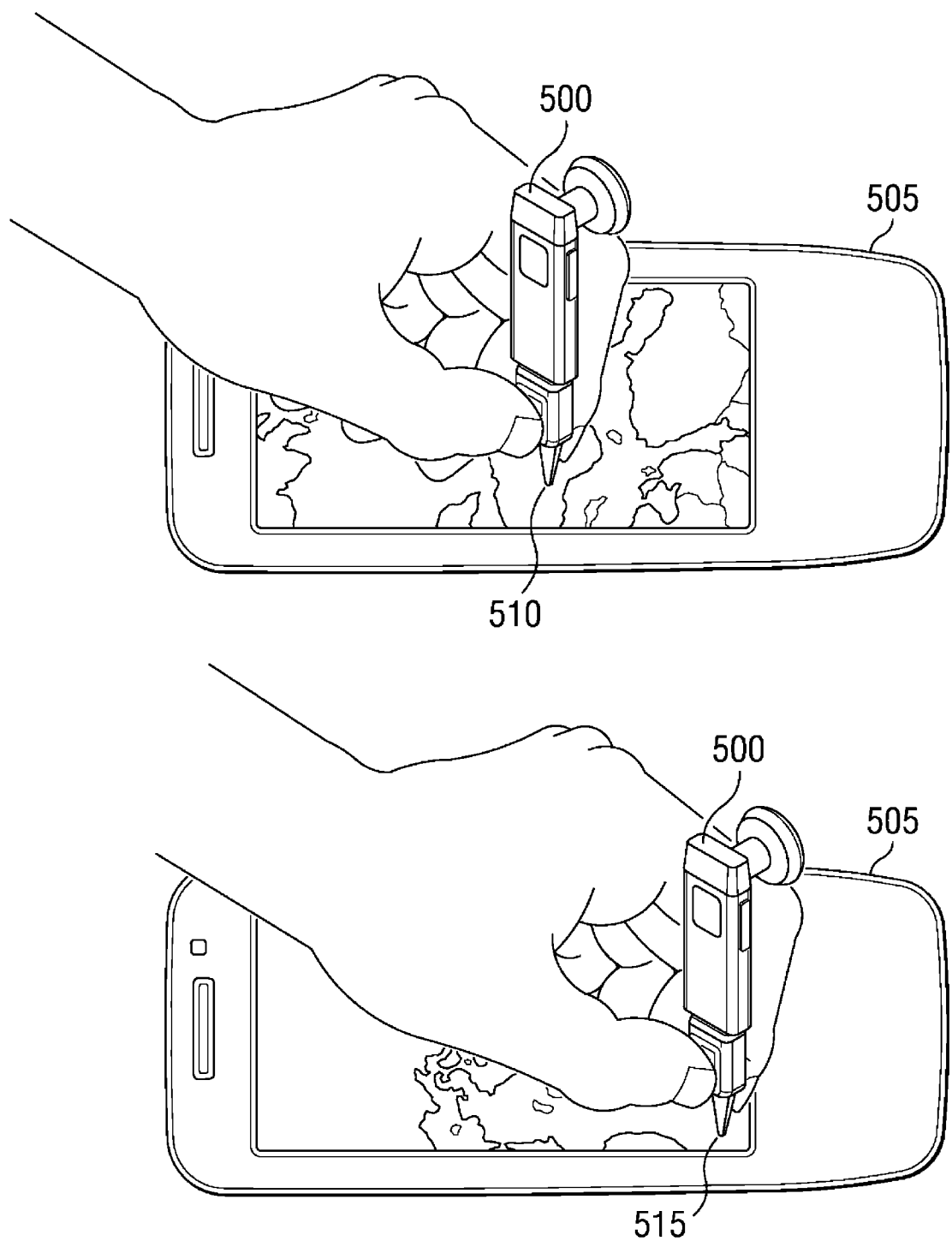
FIG. 5 is a block diagram depicting a rotating feature in accordance with an example embodiment of the invention.

FIG. 5 is a block diagram depicting a rotating feature in accordance with an example embodiment of the invention. In an example embodiment, electronic device 500 is similar to electronic device 100 of FIGS. 1A-2. In an alternative embodiment, electronic device 500 is different than electronic device 100 of FIGS. 1A-2.

In an example embodiment, an electronic device 500 interacts with a second electronic device 505. In particular, the electronic device 500 touches or otherwise selects the second electronic device 505 at a rotation point 510. In an alternative embodiment, a user touches or otherwise selects another portion of the second electronic device 505, such as a touch screen, table, center point, and/or the like, with the electronic device 500 instead of the rotation point 505. A feature activation module, such as the feature activation module 140 of FIG. 1C, is pressed or otherwise selected along with movement of the electronic device 500 to rotate 515 the view on the second electronic device 505. In this way, the electronic device 500 activates a feature, e.g., rotating the view, on the second electronic device 505.

Figure 6:
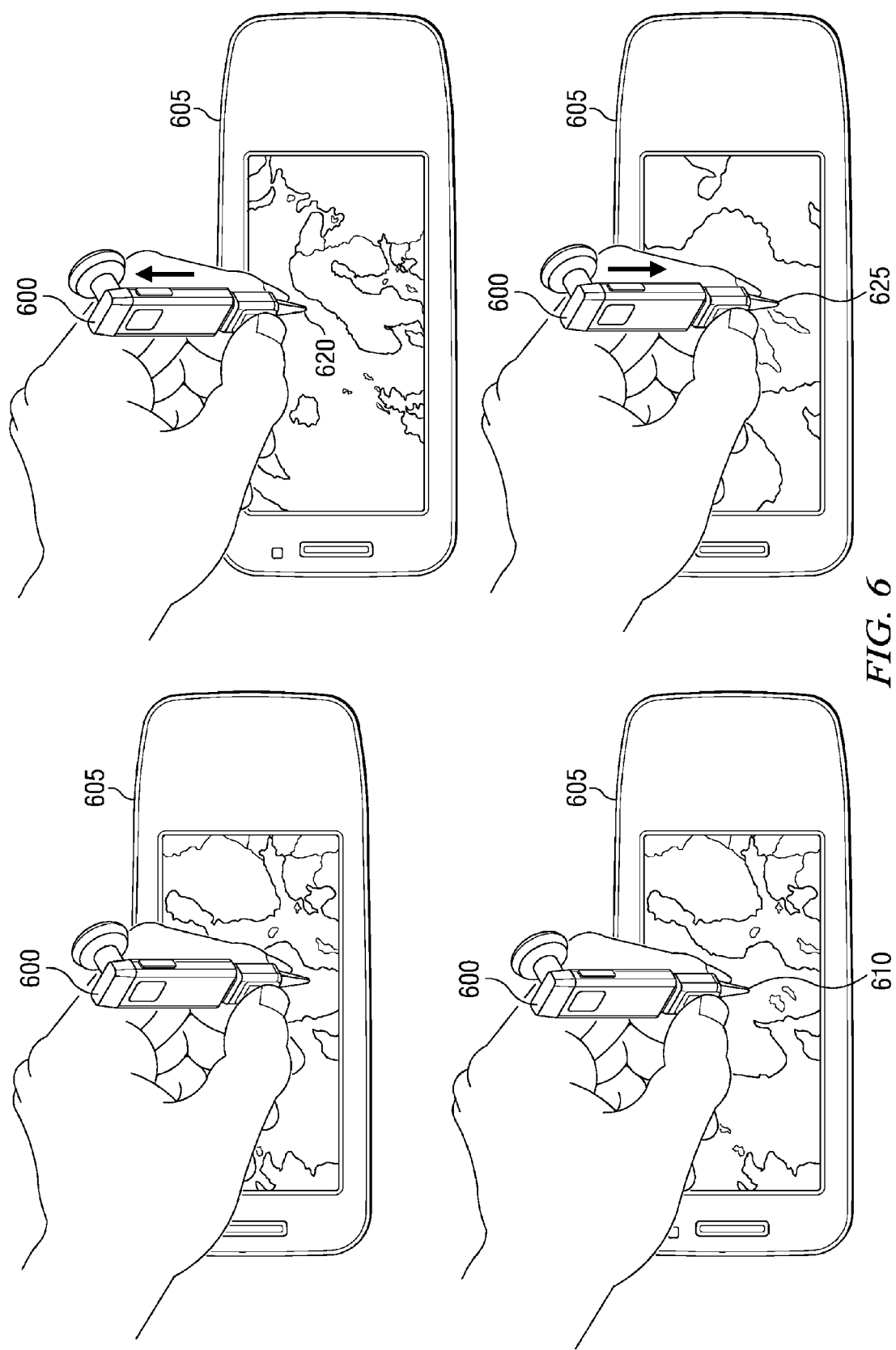
FIG. 6 is a block diagram depicting a zooming feature in accordance with an example embodiment of the invention.

FIG. 6 is a block diagram depicting a zooming feature in accordance with an example embodiment of the invention. In an example embodiment, electronic device 600 is similar to electronic device 100 of FIGS. 1A-2. In an alternative embodiment, electronic device 600 is different than electronic device 100 of FIGS. 1A-2.

In an example embodiment, an electronic device 600 interacts with a second electronic device 605. In particular, the electronic device 600 touches the second electronic device 605 at a zooming center point 610. A user may then raise 615 the electronic device 600 above the surface of the second electronic device 605. A feature activation module, such as the feature activation module 140 of FIG. 1C, is pressed or otherwise selected along with movement of the electronic device 600 to activate zoom 620 the view on the second electronic device 605. A user moves the electronic device 600 to zoom 625 the display on the second electronic device. In this way, the electronic device 600 activates a feature, e.g., zooming, on the second electronic device 605.

Without in any way limiting the scope, interpretation, or application of the claims appearing below, a technical effect of one or more of the example embodiments disclosed herein is using an electronic device as a pen and/or stylus. Another technical effect of one or more of the example embodiments disclosed herein is using an electronic device as a navigator when for example, pressing or otherwise selecting the feature activation module. Another technical effect of one or more of the example embodiments disclosed herein is using an electronic device as a 3 dimensional navigator between open documents and applications or history. Another technical effect of one or more of the example embodiments disclosed herein is using an electronic device for zooming to view content. Another technical effect of one or more of the example embodiments disclosed herein is using an electronic device as a mouse. Another technical effect of one or more of the example embodiments disclosed herein is using an electronic device to use a display and/or data projector as your canvas for displaying. Another technical effect of one or more of the example embodiments disclosed herein is using an electronic device to scan phone numbers from text and make the call by pressing or otherwise selecting the feature activation module. Another technical effect of one or more of the example embodiments disclosed herein is using an electronic device in a vehicle to zoom and/or pan a map on a global positioning system (GPS) device. Another technical effect of one or more of the example embodiments disclosed herein is using an electronic device as a remote control for a video game console, and/or the like.

Embodiments of the present invention may be implemented in software, hardware, application logic or a combination of software, hardware and application logic. The software, application logic and/or hardware may reside on an electronic device or a service. If desired, part of the software, application logic and/or hardware may reside on an electronic device and part of the software, application logic and/or hardware may reside on a service. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 1B. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
a pointing module configured to determine a location in conjunction with one or more sensors for detecting changes in an inertial frame of reference;
a camera module configured to track movement of the pointing module; and
a communicator module configured to activate a feature based at least in part on the tracked movement.

2. The apparatus of claim 1 wherein the pointing module determines location from at least one of: a mouse movement, a flick, panning, rotating, zooming, or a combination thereof.

3. The apparatus of claim 2 wherein the flick, panning, rotating, zooming, or a combination thereof indicates activation of the feature.

4. The apparatus of claim 1 further comprising a feature activation module configured to activate a feature by pressing a button or otherwise indicating selection.

5. The apparatus of claim 1 wherein the camera module is further configured to track movement on at least one of a touchscreen, a television, a projector, a table surface, a video game display, a car navigator, a computer, or a combination thereof.

6. The apparatus of claim 1 wherein the camera module is further configured to detect a distance related to the location.

7. The apparatus of claim 1 wherein the communicator module uses BlueTooth or other suitable wireless technology.

8. The apparatus of claim 1 further comprising a universal serial bus module configured to charge the apparatus.

9. The apparatus of claim 1 wherein the pointing module is configured to scan at the location.

10. The apparatus of claim 1 further configured to be used as a remote control associated with the location.

11. The apparatus of claim 1 wherein the pointing module is configured to operate as a writing implement.

12. A method, comprising:
determining a location using a pointing module in conjunction with one or more sensors for detecting changes in an inertial frame of reference;
tracking movement of the pointing module using a camera module; and
activating a feature based at least in part on the tracked movement using a communicator module.

13. The method of claim 12 wherein the pointing module determines location from at least one of: a mouse movement, a flick, panning, rotating, zooming, or a combination thereof.

14. The method of claim 13 wherein the flick, panning, rotating, zooming, or a combination thereof indicates activating of the feature.

15. The method of claim 12 further comprising activating a feature by pressing a button or otherwise indicating selection using a feature activation module.

16. The method of claim 12 wherein tracking movement further comprises tracking movement on at least one of a touchscreen, a television, a projector, a table surface, a video game display, a car navigator, a computer, or a combination thereof.

17. The method of claim 12 further comprises detecting a distance related to the location.

18. The method of claim 12 wherein the communicator module uses BlueTooth or other suitable wireless technology.

19. The method of claim 12 further comprises charging the apparatus using a universal serial bus module.

20. The method of claim 12 further comprises scanning at the location using the pointing module.

21. The method of claim 12 further comprises facilitating use as a remote control.

22. The method of claim 12 further comprises operating as a writing implement.

* * * * *